United States Patent [19]

Treleaven

[11] 4,023,273
[45] May 17, 1977

[54] SABRE-SAW GUIDE ASSEMBLY

[76] Inventor: Thomas R. Treleaven, 204 Winnipeg Ave., Thunder Bay, Canada

[22] Filed: July 26, 1976

[21] Appl. No.: 708,389

[52] U.S. Cl. .................................. 30/373; 30/376; 83/745

[51] Int. Cl.$^2$ ...................... B27B 9/04; B27B 11/04

[58] Field of Search ............ 30/376, 373, 374, 375, 30/372; 83/745

[56] References Cited

UNITED STATES PATENTS

| 1,585,535 | 5/1926 | Crogan | 30/373 |
|---|---|---|---|
| 2,735,455 | 2/1956 | Forsberg | 83/745 |
| 2,818,892 | 1/1958 | Price | 30/376 |
| 3,586,077 | 6/1971 | Pease | 30/376 |
| 3,645,306 | 2/1972 | Adams | 30/376 |
| 3,915,045 | 10/1975 | Kitzman | 30/376 X |
| 3,979,987 | 9/1976 | Mayhew | 83/745 |
| 3,983,776 | 10/1976 | Flanders | 83/745 |

Primary Examiner—Gary L. Smith
Assistant Examiner—J. C. Peters
Attorney, Agent, or Firm—Stanley G. Ade

[57] ABSTRACT

A guide assembly is provided with a pair of spaced and parallel guides and includes a carriage mounted on rollers between the guides for longitudinal movement therealong. The carriage can be clamped in position or limited in movement along the guides by means of a pair of slide guides which can be detachably clamped to the guide assembly. A sabre saw is detachably secured to the carriage and the guide assembly is clamped to the work-piece to be cut whereupon the sabre saw and the carriage is pushed along the guide assembly making a straight cut or a bevelled cut in the work-piece, depending upon the setting of the sabre saw assembly. A center pivot bearing assembly is also mounted upon the guide assembly and includes an adjustable work-piece engaging screw engaging the work-piece and acting as a center pivot so that the saw can be used for circle cutting by rotating the blade assembly 90° from the straight ahead position. This circle cutting can also be at a bevelled angle if desired. A further center pivot bearing assembly is provided at one end of the guide assembly and can be used for cutting larger diametered circles in the work-piece.

22 Claims, 15 Drawing Figures

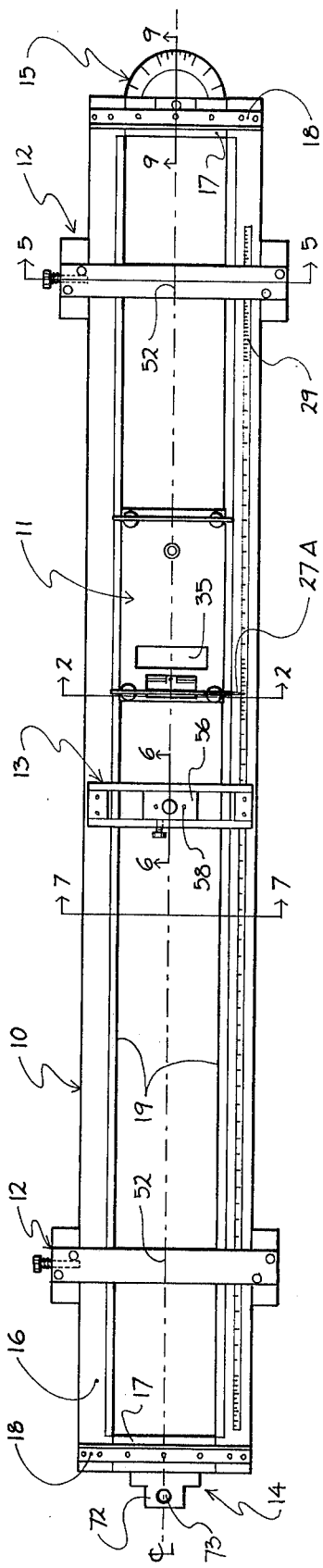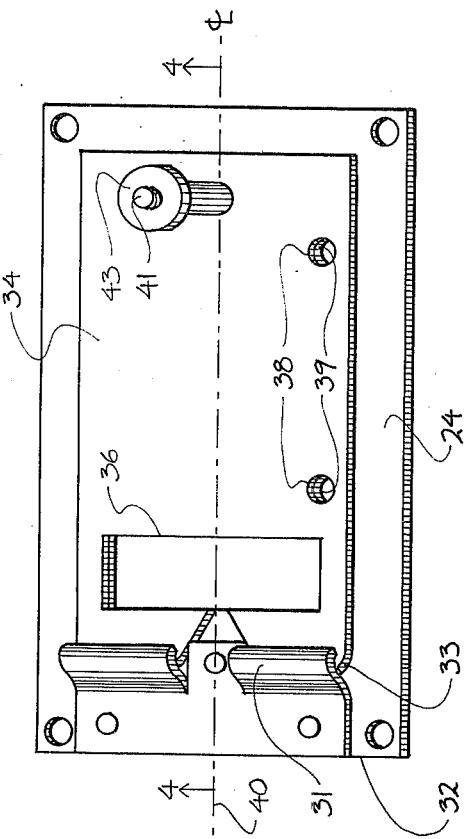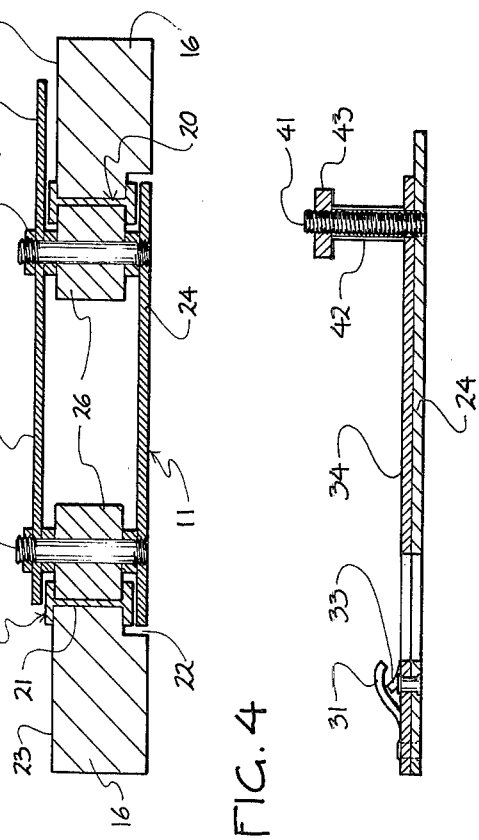

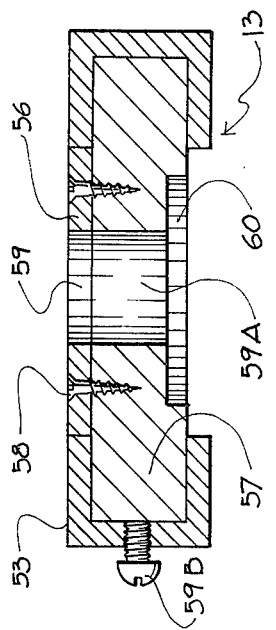
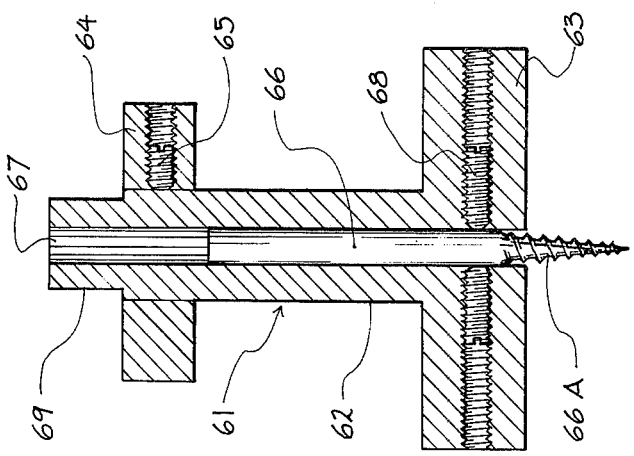
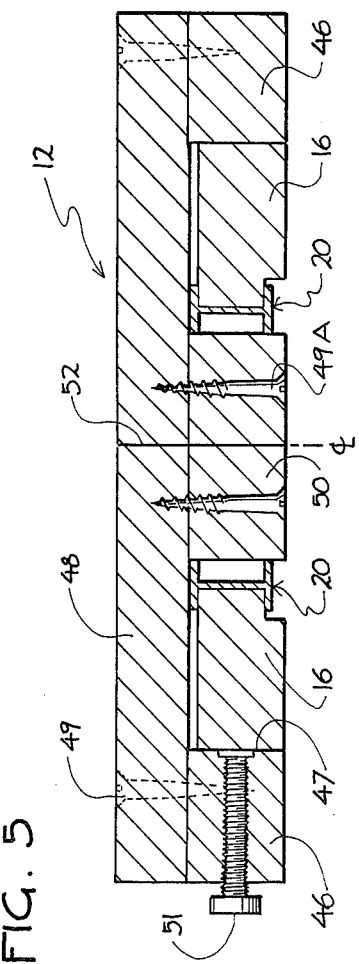
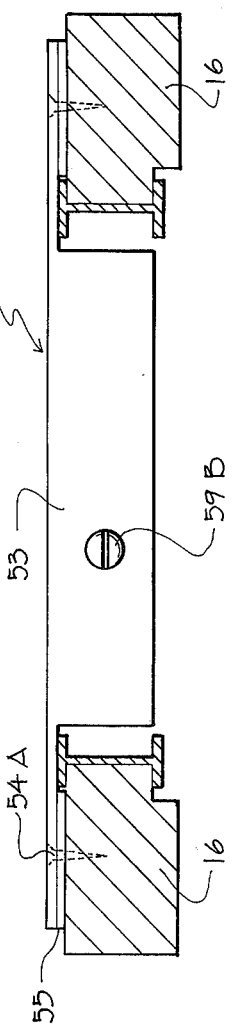
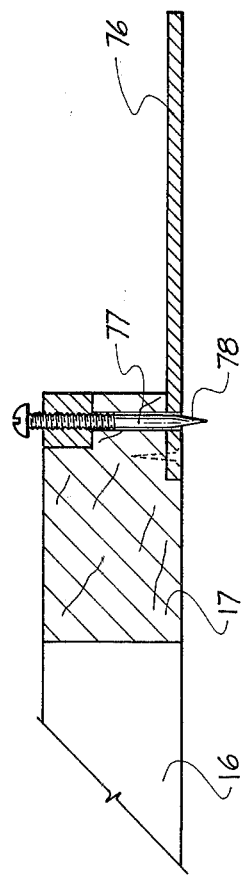

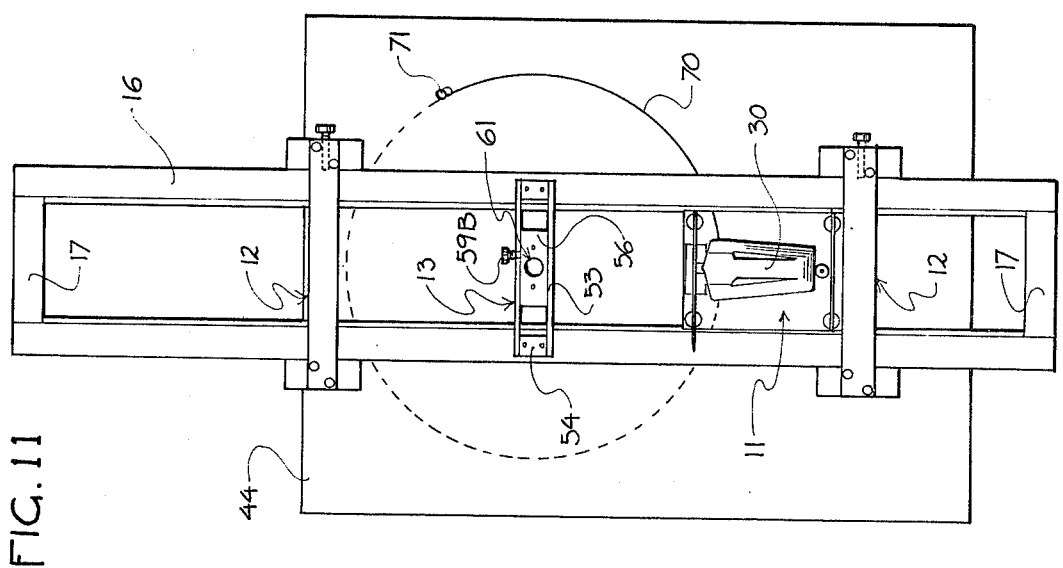
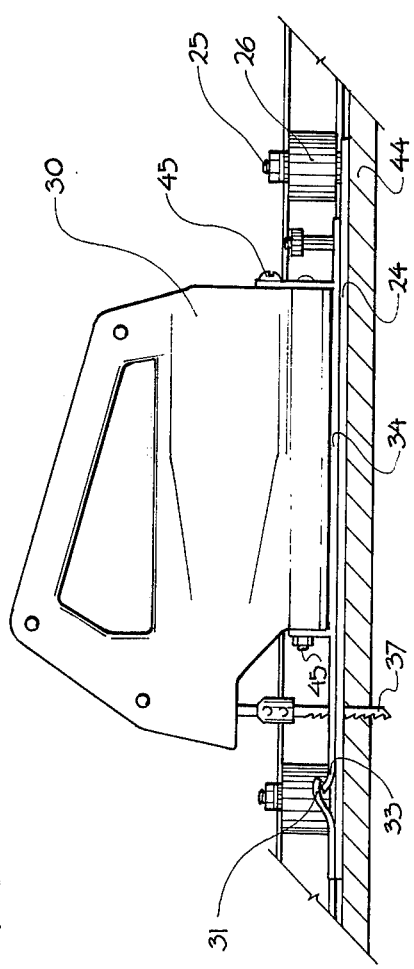
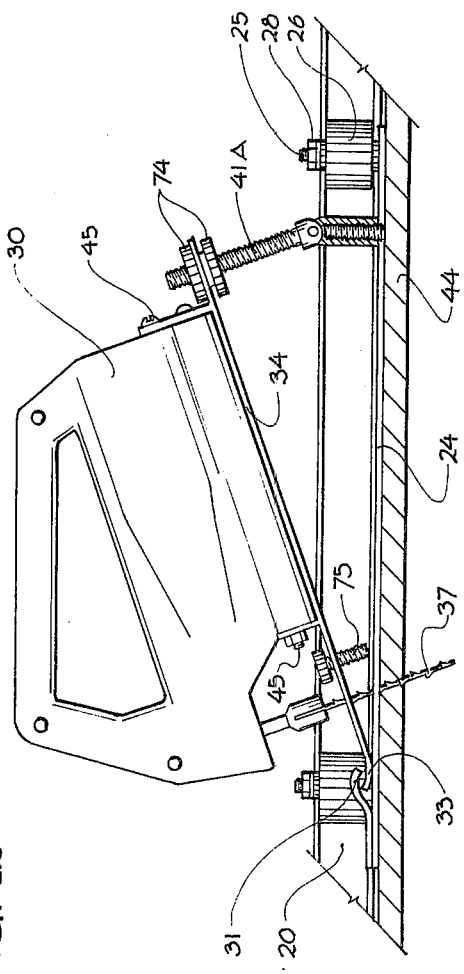

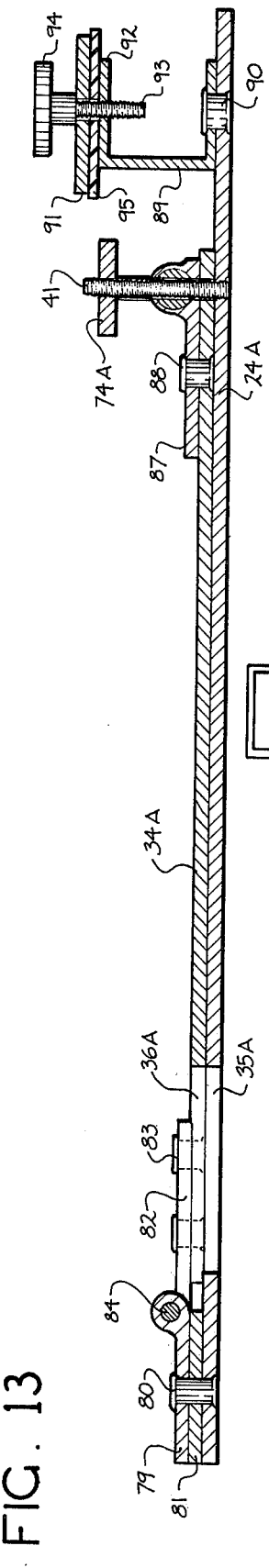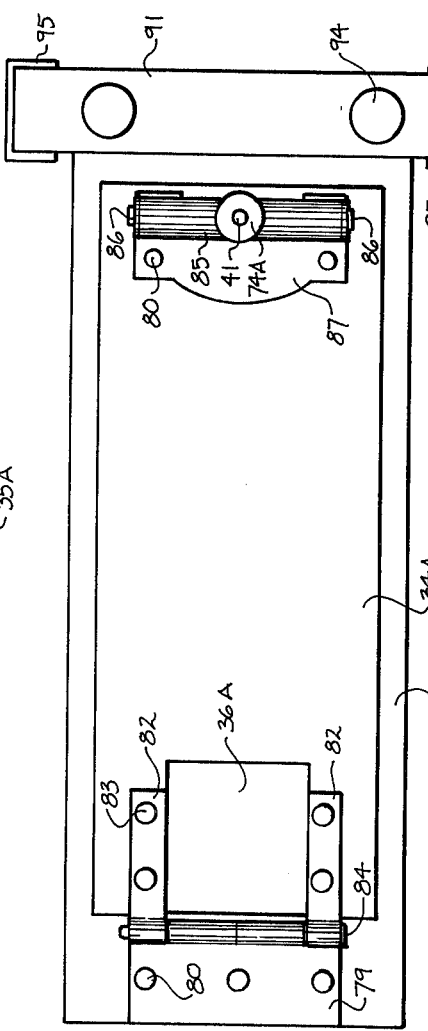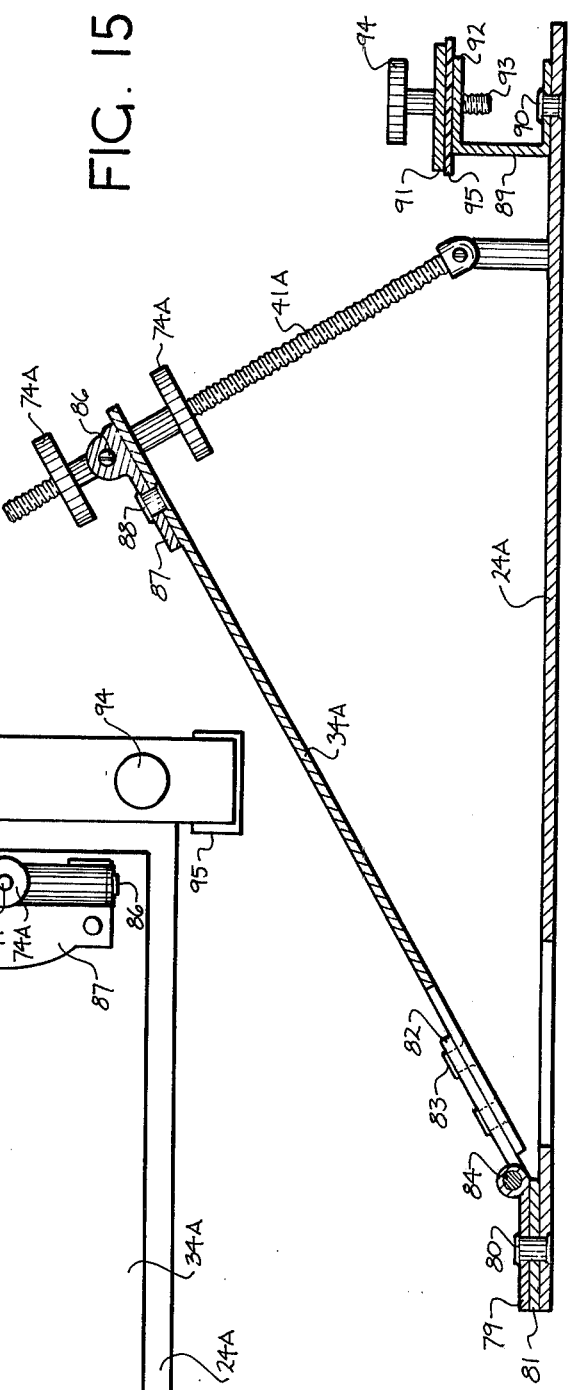

SABRE SAW GUIDE ASSEMBLY

BACKGROUND OF THE INVENTION

This invention relates to new and useful improvements in guide assemblies for sabre saws.

Conventionally, sabre saws or jig saws, are held by the operator and guided by eye along a line marked on the work-piece. This line can either be straight or curved and the majority of sabre saws include means whereby the angle of cutting of the blade can be moved from a position normal to the sole plate so that a bevelled cut can be formed.

Due to the fact that such devices are hand-guided, accuracy of the cut obviously varies so that it is difficult to use a sabre saw in cutting accurate pieces particularly when such pieces require a bevelled edge.

Furthermore, the hand operation of a sabre saw precludes the accurate cutting of circles or apertures within a work-piece.

SUMMARY OF THE INVENTION

The present invention overcomes all of these disadvantages by providing a guide assembly for sabre saws which can be clamped to a work-piece whereupon the sabre saw, mounted on a carriage within the guide assembly, can be pushed forwardly in a straight line to make an accurate straight cut either at 90° to the surface of the work-piece or at a bevelled angle thereto.

Another object of the invention is to provide a device of the character herewithin described which includes means whereby the guide assembly can be utilized as a pivot for cutting circles under which circumstances the saw blade is turned 90° to the normal direction of travel and the guide assembly is rotated around the pivot with the saw blade cutting a perfect circle either at 90° to the surface of the work-piece or at an angle thereto.

Another object of the invention is to provide a device of the character herewithin described which includes slide guides which can be clamped to the guide assembly to limit the motion of the sabre saw along the guide assembly.

Yet another object of the invention is to provide a device of the character herewithin described in which the center pivot bearing assembly includes means enabling the center pivot to be moved from side to side of the center line in order to allow for the bevelled cutting angle.

Yet another object of the invention is to provide a device of the character herewithin described which enables extremely accurate and fine work to be undertaken with a sabre saw by eliminating the hand guiding normally associated therewith.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 1 is a top plan view of the device with the associated sabre saw removed for clarity.

FIG. 2 is an enlarged cross sectional view of FIG. 1 taken through the carriage assembly and showing the mounting thereof within the frame.

FIG. 3 is an enlarged partially isometric view of the carriage assembly per se.

FIG. 4 is a longitudinal sectional view of FIG. 3.

FIG. 5 is a cross sectional view of FIG. 1 along the line 5—5 thereof.

FIG. 6 is a cross sectional view of the pivot bearing assembly along the line 6—6 of FIG. 1, but enlarged with respect thereto.

FIG. 7 is an enlarged cross sectional view of the pivot bearing assembly along the line 7—7 of FIG. 1.

FIG. 8 is an enlarged cross sectional view of the center pivot point component per se.

FIG. 9 is a fragmentary cross sectional view of one end of the guide assembly along the line 9—9 of FIG. 1.

FIG. 10 is a fragmentary sectional view showing an associated sabre saw in position upon the carriage.

FIG. 11 is a top plan view of the device on a work-piece showing the device being used as a circle cutter.

FIG. 12 is a fragmentary side elevation of the carriage with the associated sabre saw shown in position for a bevel circle cutting operation on a work-piece.

FIG. 13 is a partially sectioned side elevation of the prefered embodiment of the carriage.

FIG. 14 is a top plan view of FIG. 13.

FIG. 15 is a view similar to FIG. 13 but showing the sole plate in the raised or angulated position.

In the drawings like characters of reference indicate corresponding parts in the different figures.

GENERAL DESCRIPTION

Before describing the invention in detail, reference should be made to FIG. 1 in which reference character 10 illustrates generally, the guide assembly having a carriage collectively designated 11 mounted therein for sliding movement therealong. A pair of slide guides collectively designated 12 are provided along the length of the assembly and a center pivot bearing assembly collectively designated 13 is detachably secured along the length of the assembly 10. A further pivot bearing assembly collectively designated 14 is provided at one end of the assembly and a protractor assembly collectively designated 15 is provided at the other end of the assembly.

DETAILED DESCRIPTION

In detail, the guide assembly 10 comprises a pair of spaced and parallel longitudinally extending side members 16 made preferably from hardwood and having a spacer block or member 17 situated between the ends thereof, the assembly being held in the rectangular configuration shown in FIG. 1, by means of a pair of end straps 18 screwed to the ends of the side members 16 and the blocks 17.

A pair of I-beams 20 are secured as by adhesive or by countersunk screws, to the inner faces 21 of the side members 16 and reference to FIG. 2 will show that the lower corners 22 of the inner faces 21 of these members 16 are cut away, to receive one side of the lower flange of the I-beams 20 and that one part of the upper flanges overlaps the upper side 23 of the side members 16.

The inner facing channels of the I-beams 20 act as guides or rails to mount the aforementioned carriage 11 for longitudinal sliding or rolling movement between the side members 16. FIGS. 2 and 3 show details of this carriage 11 which consists of a substantially rectangular base plate 24 having spindles or shafts 25 screw threadably engaged within the base plate adjacent the corners thereof and extending upwardly therefrom.

Rollers 26 are journalled for rotation upon the spindles and engage the aforementioned I-beams 20 as clearly illustrated in FIG. 2.

Spacers in the form of straps 27 engage over the upper ends of shafts 25 and are secured in position by means of nuts 28 and one of the spacers is provided with an extension 27A in the form of a pointer which slides over a measuring rule or the like 29 secured to the upper surface of one of the side members 16 and shown clearly in FIG. 1.

The base plate 24 which is situated substantially flush with the underside of the side members 16, includes means for detachably securing an associated sabre saw 30 (see FIG. 10).

A pair of anchor clips 31 are secured as by rivets to adjacent the front end 32 of the base plate and curve upwardly and then downwardly as clearly shown in FIGS. 3 and 4, and the upturned front end 33 of the sabre saw base plate 34, engages under these clips as shown in FIG. 3. In this connection, the sole plate 34 of the sabre saw is shown without the sabre saw mounted thereon, for clarity.

The base plate is also provided with a rectangular cut-out 35 to match the rectangular cut-out 36 on the sole plate 34 and through which the sabre saw blade 37 normally reciprocates. Reference to FIG. 3 will show a pair of apertures 38 through the sole plate 34 which are matched with corresponding apertures 39 through the base plate 24, when the sabre saw is attached to the base plate in order to ensure correct positioning of the sabre saw with the base plate so that the blade 37 is aligned with the center line 40 of the guide frame assembly.

Means are provided to clamp the sole plate in position upon the base plate and are shown in detail in FIGS. 3 and 4. In this particular embodiment, a screw threaded bolt 41 is secured to the base plate 24 and extends upwardly therefrom and through an aperture within the sole plate 34. A sleeve 42 engages over this bolt and the upper end of the sleeve thus clamping the sole plate to the base plate when the knurled nut is tightened downwardly.

Reference to FIG. 4 will show the sole plate clamped firmly in position upon the base plate, once again it being understood that the sabre saw has been removed for clarity.

From the foregoing, it will be appreciated that if the guide assembly 10 is clamped to a work-piece such as a sheet of plywood 44 (see FIG. 10), by means of C-clamps (not illustrated) the carriage together with the sabre saw 30 can be pushed along the guide assembly thus cutting a straight line with the blade 37.

It will also be appreciated that the normal mounting of the sabre saw 30 to the sole plate 34 by means of nut and bolt assemblies 45, will enable the sabre saw assembly to be tilted to one side or the other relative to the sole plate so that the blades 37 can make an angled or bevelled cut if desired.

Slide guides 12 are provided to limit the motion of the carriage along the guide assembly if this is desirable and two such slide guides are shown in the present embodiment. These are shown in detail in FIG. 5. A pair of hardwood blocks or the like 46 slidably engaged the undersides 47 of the side members 16 and are maintained in the desired position by means of a cross member 48 secured to the blocks by means of countersunk screws 49. A central block 50 is secured to the underside of the cross member 48 centrally thereof by means of screws 49A and the sides of this block slidably engage the inner edges of the I-beams 20 as clearly shown in FIG. 5.

This means that the slide guides will slide readily along the side members 16 of the guide frame 10. A clamp bolt 51 is screw threadably engaged through one of the side blocks 46 and enables the slide guide to be detachably clamped in any desired position along the length of the guide frame assembly. A groove or line 52 is formed on the top and both side surfaces of the cross member 48 and the front and rear side surfaces of the center block 50 and indicates the exact center line of the slide guide and hence the center line between the side members 16. This enables the assembly to be clamped in the desired position upon a work-piece, upon which a line has been drawn indicating the line of cut. This ensures correct positioning of the assembly and hence correct cutting by the saw.

If it is desired to cut circles with the assembly, then either the center pivot bearing assembly 13 is used or the end pivot bearing assembly 14.

Dealing first with the center pivot bearing assembly 13, reference should be made to FIGS. 6 and 7.

This assembly comprises a pair of transverse channel members 53 preferably made of aluminum or similar material maintained in the desired spaced and parallel relationship by means of end tie plates and spacers 54 to which they are secured as clearly shown in FIG. 1. In this connection, the end portions of the channels 53 have the side plates removed so that they engage over the upper surfaces of the side members 16 to which they may be detachably secured by means of countersunk screws 54A, relatively thin spacers 55 being provided as clearly shown in FIG. 7.

A substantially rectangular centrally apertured slide plate 56 is secured to a substantially rectangular block 57 by means of countersunk screws 58 and the ends of this block 57 slidably engage within the channels 53 as shown in FIG. 6. A clamp screw 59B is screw threadably engageable through one side of one of the channels 53 and clamps the block in any desired position as will hereinafter be described.

This block 57 is also centrally apertured to match with the aperture 59 within the plate 56 and the area around the lower end of the aperture within the block 57 is recessed as indicated by reference character 60 in FIG. 6.

FIG. 8 shows the details of the pivot point component collectively designated 61 which detachably engages the aperture 59 and the corresponding aperture 59A in the plate 56 and block 57 respectively. The component 61 includes a cylindrical stem 62 and a bottom flange 63, the stem engaging the apertures 59 and 59A with the bottom flange 63 recessing into the recess 60.

Sliding collar 64 engages the upper end of the stem and the upper surface of plate 56 surrounding the aperture 59 and is clamped into position upon the stem by means of set screw 65 thus holding the assembly in position. An adjustable centering screw 66 slidably engages a central aperture 67 within the stem 62 and is clamped into the desired position by means of set screws 68 engaging through the lower flange 63 and it will be observed that the lower end 66A of the screw 66 is pointed and screw threaded so that it can engage within a work-piece when it is desired to cut a circle therefrom. The depth of penetration of the screw threaded portion 66A is controlled by means of the set screw 68 and flats 69 are provided on the upper end of the stem so that a wrench can be engaged thereon, to screw threadably engage the lower end 66A within the work-piece.

Reference to FIG. 11 will show the device being used to cut a circle within a work-piece 44.

The circle to be cut is first marked by means of a conventional trammel, said circle being indicated by reference character 70. A series of small holes 71 are drilled anywhere on the periphery of the circle, to enable the saw blade 37 to pass through the work-piece. In this connection, it will be appreciated that the saw blade has to be turned 90° to its normal direction of travel and this can be accomplished by a chuck assembly (not illustrated) which is similar to the chuck assembly of a power jigsaw.

The component 61 is placed in position upon the central pivot bearing assembly 13 and the lower screw threaded end 66A is screw threadably engaged within the work-piece at the exact center of the circle 70 to be cut. The carriage together with the sabre saw is positioned along the guide assembly so that the blade engages the small drillings 71 formed through the work-piece at the line of cut whereupon the slide guide 12 is moved up against the rear of the sole plate and clamped in position.

The handle of the sabre saw is grasped by the operator and with the saw being held back against the slide guide 12, the frame assembly is rotated around the central pivot guide assembly 13 thus cutting the circle precisely upon the line 70 already marked on the work-piece.

This central pivot bearing assembly 13 is usable for cutting circles having a radius up to half the length of the side members 16, but if circles of a larger diameter are required, then the pivot bearing assembly 14 is utilized.

This consists of an apertured block 72 secured to one end of the assembly 10 with the aperture 73 being similar to the aperture 59 so that it will receive the component 61 in the same manner. Once again the slide guide 12 is used to position the carriage and hence the sabre saw and the entire assembly is pivotted around the component 61 engaging through aperture 73.

If it is desired that this circle be cut with a bevel then the sabre saw must be tilted as shown in FIG. 12.

In this embodiment, the screw 41A is pivotally secured by the lower end to the base plate 24 and upper and lower knurled nuts 74 position the sole plate at an angle to the base plate 24 pivotting around the anchor clips 31. A clamp screw or bolt 75 screw threadably engages the sole plate 34 just rearwardly of the anchor clips 31 and engages the base plate so that, when tightened, it clamps the sole plate firmly in position relative to the base plate as clearly shown.

The protractor assembly 15 includes a protractor 76 secured to one end of the assembly, being provided with a screw 77 at the center point thereof which can be screwed upwardly or downwardly so that the lower pointed end 78 projects below the surface of the guide assembly. This enables it to be centered so that various angles can be laid off by the protractor upon the work-piece.

Although various parts of the assembly can be manufactured from wood, nevertheless it will be appreciated that any desired materials can be used. The I-beam 20 and channels 53, together with sole plate 34, plate 56 and components 61 are preferably made of metal such as aluminum or the like.

FIGS. 13, 14 and 15 show the prefered embodiment of the device and where similar components are used, similar reference characters have been given with the exception that a suffix A has been added thereto.

The base plate 24A of the carriage, is provided with one portion 79 of a hinge secured to the base plate by means of rivets 80, with a small spacer plate 81 being interposed between the hinge portion 79 and the base plate 24A.

The adjacent portion of the sole plate 34A carries the other portion 82 of the hinge secured thereto by means of rivets 83 as ciearly shown in FIGS. 13 and 14. This portion is cut away in the center where it coincides with the rectangular cut-outs 35 and 36A of the base plate 24A and the sole plate 34A respectively.

A detachable hinge pin 84 joins the two hinge portions 79 and 82 together so that the sole plate 34A can be pivoted upwardly relative to the base plate 24A, it being understood that the hinge assembly takes the place of the clips 31 and the upturned end 33A shown in FIG. 3.

This gives a much steadier mounting for the sabre saw and allows for extreme angle cuts.

FIG. 12 illustrates one method of elevating the sabre saw relative to the base plate 24 and FIGS. 13 and 15 show the prefered embodiment required for use with the hinge assembly just described.

The screw threaded bolt assembly 41A is similar in construction to that shown in FIG. 12 including the upper and lower knurled nuts 74A. However the mounting of the screw threaded bolt 41A through the sole plate 34A is slightly different inasmuch as it extends freely through an aperture (not illustrated) formed in a roller 85 journalled for rotation between pivot pins 86 which in turn are supported upon an angulated bracket assembly 87 secured to the sole plate 34A by means of rivets or the like 88.

This enables the sole plate 34A to be elevated to a greater degree than the structure shown in FIG. 12 by eliminating all bending strain from the screw threaded rod 41A and also eliminating any errors from the exact saw angle settings which might be caused by normal saw vibrations.

Another improvement in this embodiment is that the slide guides 12 are not required for braking purposes.

This is accomplished by the provision of a U-shaped bracket 89 secured transversely of the rear end of the base plate 24A by means of rivets or the like 90.

A transversely extending brake plate 91 is supported upon the upper flange 92 of the U-shaped bracket 89 by means of screw threaded bolts 93 surmounted by knurled upper portions 94.

Rubber brake pads 95 are secured to the underside of the outer ends of the transverse brake plate 91 and are adapted to bear against the guide members 12 when the knurled portions 94 are rotated thus clamping the carriage firmly in position at the desired location along the guides 12, it being understood that the carriage is mounted between the I-beams 20 as hereinbefore described.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In a guide assembly for sabre saws which include a sole plate, a reciprocating saw blade passing through the sole plate, means to adjust the angle of said saw blade relative to the sole plate for bevel cutting, and means to turn the saw blade through 90° for straight ahead cutting or circle cutting; said guide assembly comprising in combination a substantially rectangular frame having a pair of spaced and parallel, longitudinally extending side members, means at each end of said side members extending transversely therebetween to maintain said side members in the aforesaid spaced and parallel relationship, a carriage mounted for endwise sliding movement between said side members, means on said carriage for detachably supporting an associated sabre saw by the sole plate thereof, adjustable means movable along said side members to limit the longitudinal movement of the said carriage along said side members and at least one center pivot bearing assembly on said frame for pivoting said frame for rotative movement around said center pivot bearing assembly for circle cutting action of said associated sabre saw.

2. The invention according to claim 1 in which said side members each include a longitudinally extending I-beam secured to the inner edge thereof, said carriage including a carriage base plate, a roller pivoted for rotation adjacent each of the corners of said base plate and engaging within the opposed flanges of said I-beams, shafts mounting said rollers for rotation, a carriage roller shaft spacer engaging opposing shafts for mounting the rollers of the front pair and of the rear pair of rollers in spaced relationship with each other, and means on said base plate for detachably clamping the sole plate of the associated sabre saw upon said carriage.

3. The invention according to claim 2 in which said means includes an anchor clip adjacent the front end of the base plate, the front end of the sole plate engaging under said anchor clip, and clamp bolt means operatively extending between the sole plate and the base plate adjacent the rear ends thereof for clamping said sole plate to said base plate.

4. The invention according to claim 2 in which said clamp bolt means includes a screw threaded bolt pivotally secured by the lower end thereof to said base plate and freely extending through said sole plate, and upper and lower nuts screw threadably engaging said bolt one above and one below said sole plate for adjusting the angle of said sole plate with said base plate with said sole plate pivoting about said anchor clip and a clamp bolt screw threadably engaging through said sole plate adjacent said anchor clip and engaging said base plate to tighten the engagement of said sole plate within said anchor clip.

5. The invention according to claim 1 in which said adjustable means movable along said side members comprises a slide guide, said slide guide including a transverse member spanning said side members, downwardly extending portions on each end of said transverse member slidably engaging with the outer edges of said side members, a center member depending downwardly from said transverse member between said side members with the edges of said center member slidably engaging the inner edges of said side members and means to detachably clamp said slide guide into position along said slide members.

6. The invention according to claim 2 in which said adjustable means movable along said side members comprises a slide guide, said slide guide including a transverse member spanning said side members, downwardly extending portions on each end of said transverse member slidably engaging with the outer edges of said side members, a center member depending downwardly from said transverse member between said side members with the edges of said center member slidably engaging the inner edges of said side members and means to detachably clamp said slide guide into position along said slide members.

7. The invention according to claim 3 in which said adjustable means movably along said side members comprises a slide guide, said slide guide including a transverse member spanning said side members, downwardly extending portions on each end of said transverse member slidably engaging with the outer edges of said side members, a center member depending downwardly from said transverse member between said side members with the edges of said center member slidably engaging the inner edges of said side members and means to detachably clamp said slide guide into position along said slide members.

8. The invention according to claim 4 in which said adjustable means movable along said side members comprises a slide guide, said slide guide including a transverse member spanning said side members, downwardly extending portions on each end of said transverse member slidably engaging with the outer edges of said side members, a center member depending downwardly from said transverse member between said side members with the edges of said center member slidably engaging the inner edges of said side members and means to detachably clamp said slide guide into position along said slide members.

9. The invention according to claim 1 in which said center pivot bearing assembly includes a pair of spaced and parallel transverse members spanning said side members, tie plates at each end of said transverse members, a central pivot support block mounted for limited transverse movement between said transverse members, means to detachably clamp said block in the desired position relative to said transverse member and a detachable central pivot point component detachably secured to said block with the lower end extending downwardly therefrom and a further center pivot bearing assembly secured at one end of said guide assembly, said pivot point component being selectively engageable within said first mentioned pivot bearing assembly and said last mentioned pivot bearing assembly.

10. The invention according to claim 2 in which said center pivot bearing assembly includes a pair of spaced and parallel transverse members spanning said side members, tie plates at each end of said transverse members, a central pivot support block mounted for limited transverse movement between said transverse members, means to detachably clamp said block in the desired position relative to said transverse member and a detachable central pivot point component detachably secured to said block with the lower end extending downwardly therefrom and a further center pivot bearing assembly secured at one end of said guide assembly, said pivot point component being selectively engageable within said first mentioned pivot bearing assembly and said last mentioned pivot bearing assembly.

11. The invention according to claim 3 in which said center pivot bearing assembly includes a pair of spaced and parallel transverse members spanning said side members, tie plates at each end of said transverse members, a central pivot support block mounted for limited transverse movement between said transverse members, means to detachably clamp said block in the desired position relative to said transverse member and a detachable central pivot point component detachably secured to said block with the lower end extending downwardly therefrom and a further center pivot bearing assembly secured at one end of said guide assembly, said pivot point component being selectively engageable within said first mentioned pivot bearing assembly and said last mentioned pivot bearing assembly.

12. The invention according to claim 4 in which said center pivot bearing assembly includes a pair of spaced and parallel transverse members spanning said side members, tie plates at each end of said transverse members, a central pivot support block mounted for limited transverse movement between said transverse members, means to detachably clamp said block in the desired position relative to said transverse member and a detachable central pivot point component detachably secured to said block with the lower end extending downwardly therefrom and a further center pivot bearing assembly secured at one end of said guide assembly, said pivot point component being selectively engageable within said first mentioned pivot bearing assembly and said last mentioned pivot bearing assembly.

13. The invention according to claim 5 in which said center pivot bearing assembly includes a pair of spaced and parallel transverse members spanning said side members, tie plates at each end of said transverse members, a central pivot support block mounted for limited transverse movement between said transverse members, means to detachably clamp said block in the desired position relative to said transverse member and a detachable central pivot point component detachably secured to said block with the lower end extending downwardly therefrom and a further center pivot bearing assembly secured at one end of said guide assembly, said pivot point component being selectively engageable within said first mentioned pivot bearing assembly and said last mentioned pivot bearing assembly.

14. The invention according to claim 6 in which said center pivot bearing assembly includes a pair of spaced and parallel transverse members spanning said side members, tie plates at each end of said transverse members, a central pivot support block mounted for limited transverse movement between said transverse members, means to detachably clamp said block in the desired position relative to said transverse member and a detachable central pivot point component detachably secured to said block with the lower end extending downwardly therefrom and a further center pivot bearing assembly secured at one end of said guide assembly, said pivot point component being selectively engageable within said first mentioned pivot bearing assembly and said last mentioned pivot bearing assembly.

15. The invention according to claim 7 in which said center pivot bearing assembly includes a pair of spaced and parallel transverse members spanning said side members, tie plates at each end of said transverse members, a central pivot support block mounted for limited transverse movement between said transverse members, means to detachably clamp said block in the desired position relative to said transverse member and a detachable central pivot point component detachably secured to said block with the lower end extending downwardly therefrom and a further center pivot bearing assembly secured at one end of said guide assembly, said pivot point component being selectively engageable within said first mentioned pivot bearing assembly and said last mentioned pivot bearing assembly.

16. The invention according to claim 8 in which said center pivot bearing assembly includes a pair of spaced and parallel transverse members spanning said side members, tie plates at each end of said transverse members, a central pivot support block mounted for limited transverse movement between said transverse members, means to detachably clamp said block in the desired position relative to said transverse member and a detachable central pivot point component detachably secured to said block with the lower end extending downwardly therefrom and a further center pivot bearing assembly secured at one end of said guide assembly, said pivot point component being selectively engageable within said first mentioned pivot bearing assembly and said last mentioned pivot bearing assembly.

17. In a guide assembly for sabre saws which include a sole plate, a reciprocating saw blade passing through the sole plate, means to adjust the angle of said saw blade relative to the sole plate for bevel cutting, and means to turn the saw blade through 90° for straight ahead cutting or circle cutting; said guide assembly comprising in combination a substantially rectangular frame having a pair of spaced and parallel, longitudinally extending side members, means at each end of said side members extending transversely therebetween to maintain said side members in the aforesaid spaced and parallel relationship, a carriage mounted for endwise sliding movement between said side members, means on said carriage for detachably supporting an associated sabre saw by the sole plate thereof, means cooperating between said carriage and said side members to limit the longitudinal movement of the said carriage along said side members and at least one center pivot bearing assembly on said frame for pivoting said frame for rotative movement around said center pivot bearing assembly for circle cutting action of said associated sabre saw.

18. The invention according to claim 17 in which said carriage includes a base plate upon which the sabre saw is detachably secured, said means for detachably supporting the sabre saw including one portion of a hinge secured to adjacent one end of said base plate, the other portion of said hinge being secured to the adjacent end of said sole plate of said sabre saw, and a detachable hinge pin connecting said portions of said hinge together.

19. The invention according to claim 18 which includes a screw threaded bolt pivotally secured by the lower end thereof to said base plate, means mounting said screw threaded bolt to said sole plate, said last mentioned means including trunnion means mounted on said sole plate, said screw threaded bolt freely extending through said trunnion means, an upper and lower nut screw threadably engaging said bolt one above and one below said sole plate for adjusting the angle of said sole plate in said base plate with said sole plate pivoting about said hinge.

20. The invention according to claim 17 in which said means cooperating between said carriage and said side members includes a brake bar mounted across one end of said base plate, said member engaging friction pads on the underside of each end of said brake bar and means cooperating between said base plate and said brake bar to detachably clamp said pads in binding engagement upon said side members to detachably secure said carriage against movement along said side members.

21. The invention according to claim 18 in which said means cooperating between said carriage and said side members includes a brake bar mounted across one end of said base plate, side member engaging friction pads on the underside of each end of said brake bar and means cooperating between said base plate and said brake bar to detachably clamp said pads in binding engagement upon said side members to detachably secure said carriage against movement along said side members.

22. The invention according to claim 19 in which said means cooperating between said carriage and said side members includes a brake bar mounted across one end of said base plate, side member engaging friction pads on the underside of each end of said brake bar and means cooperating between said base plate and said brake bar to detachably clamp said pads in binding engagement upon said side members to detachably secure said carriage against movement along said side members.

* * * * *